United States Patent [19]
Emerson et al.

[11] Patent Number: 5,529,464
[45] Date of Patent: Jun. 25, 1996

[54] CRYOGENIC TURBOPUMP

[75] Inventors: Terence P. Emerson, Hermosa Beach; Alston L. Gu, Rancho Palos Verdes, both of Calif.

[73] Assignee: AlliedSignal Inc., Morris Township, N.J.

[21] Appl. No.: 217,924

[22] Filed: Jul. 12, 1988

[51] Int. Cl.$^6$ .................................................. F04B 17/00
[52] U.S. Cl. .......................... 417/405; 415/178; 415/110; 384/106
[58] Field of Search ............................ 417/405; 415/178, 415/110; 384/106, 105, 115, 103, 124

[56] References Cited

U.S. PATENT DOCUMENTS

| | | | |
|---|---|---|---|
| 2,921,533 | 1/1960 | Williams | 415/112 |
| 2,936,714 | 5/1960 | Balje | 415/112 |
| 2,956,502 | 10/1960 | Glaser et al. | 415/112 |
| 3,033,120 | 5/1962 | Williams | 417/406 |
| 3,250,221 | 5/1966 | Williams | 415/112 |
| 3,364,866 | 1/1968 | Sato | 384/122 |
| 3,382,014 | 5/1968 | Marley | 384/106 |
| 3,563,618 | 2/1971 | Ivanov | 384/121 |
| 3,728,857 | 4/1973 | Nichols | 415/110 |
| 3,764,236 | 10/1973 | Carter | 417/372 |
| 3,895,689 | 7/1975 | Swearingten | 384/121 |
| 3,975,117 | 8/1976 | Carter | 417/901 |
| 4,355,850 | 10/1982 | Okano | 384/121 |
| 4,684,318 | 8/1987 | Muldens | 415/110 |
| 4,792,278 | 12/1988 | Emerson | 415/178 |
| 4,808,070 | 2/1989 | Bonardi | 415/110 |

Primary Examiner—Donald P. Walsh
Attorney, Agent, or Firm—James W. McFarland

[57] ABSTRACT

A turbopump which operates at cryogenic temperatures to pump cryogenic liquid fuels to high pressure which includes a rotating group including a shaft mounted turbine to directly drive a multistage pump with the rotating group being supported on process fluid foil journal bearings and a hydrostatic and hydrodynamic hybrid thrust bearing.

20 Claims, 4 Drawing Sheets

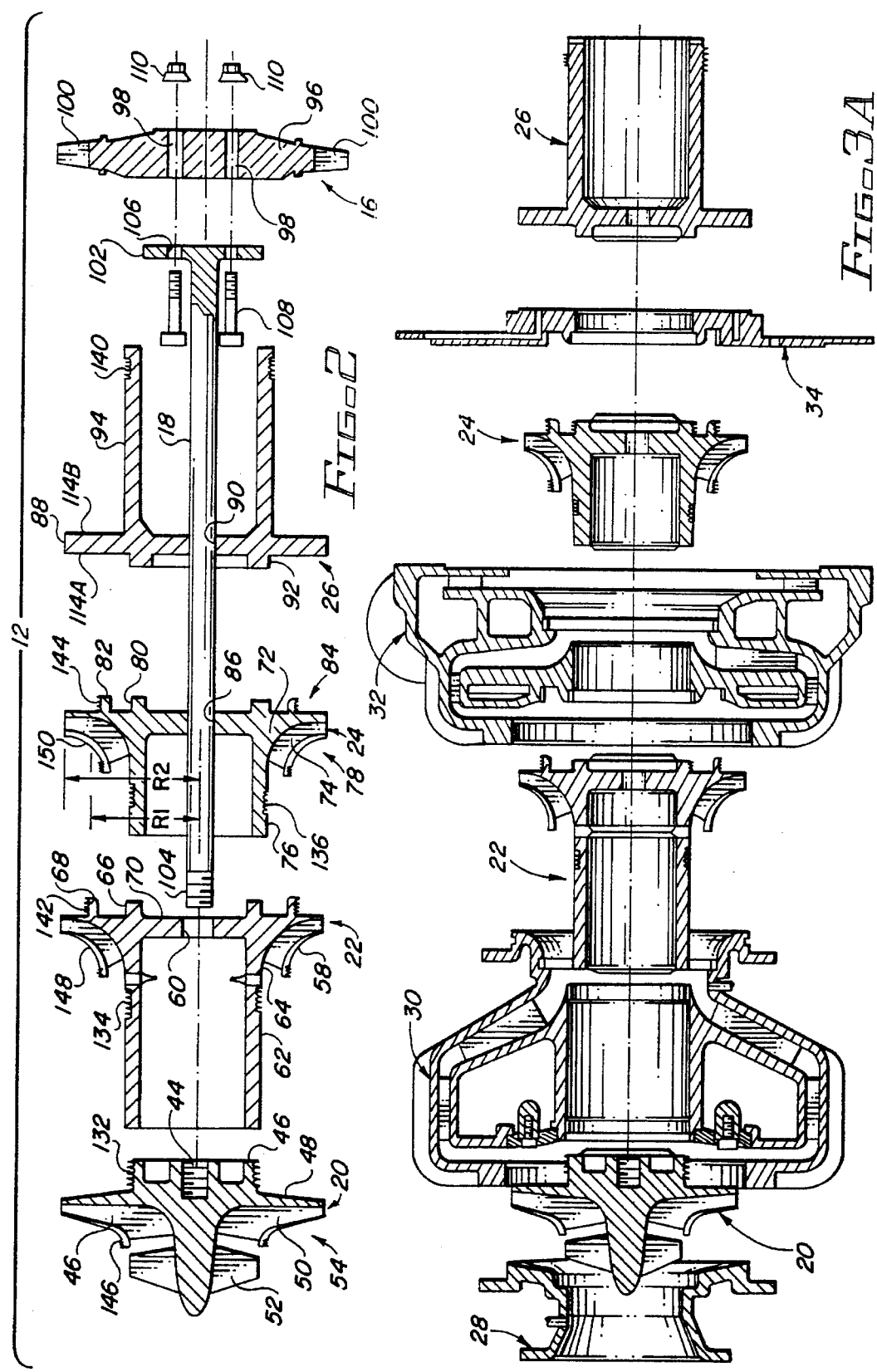

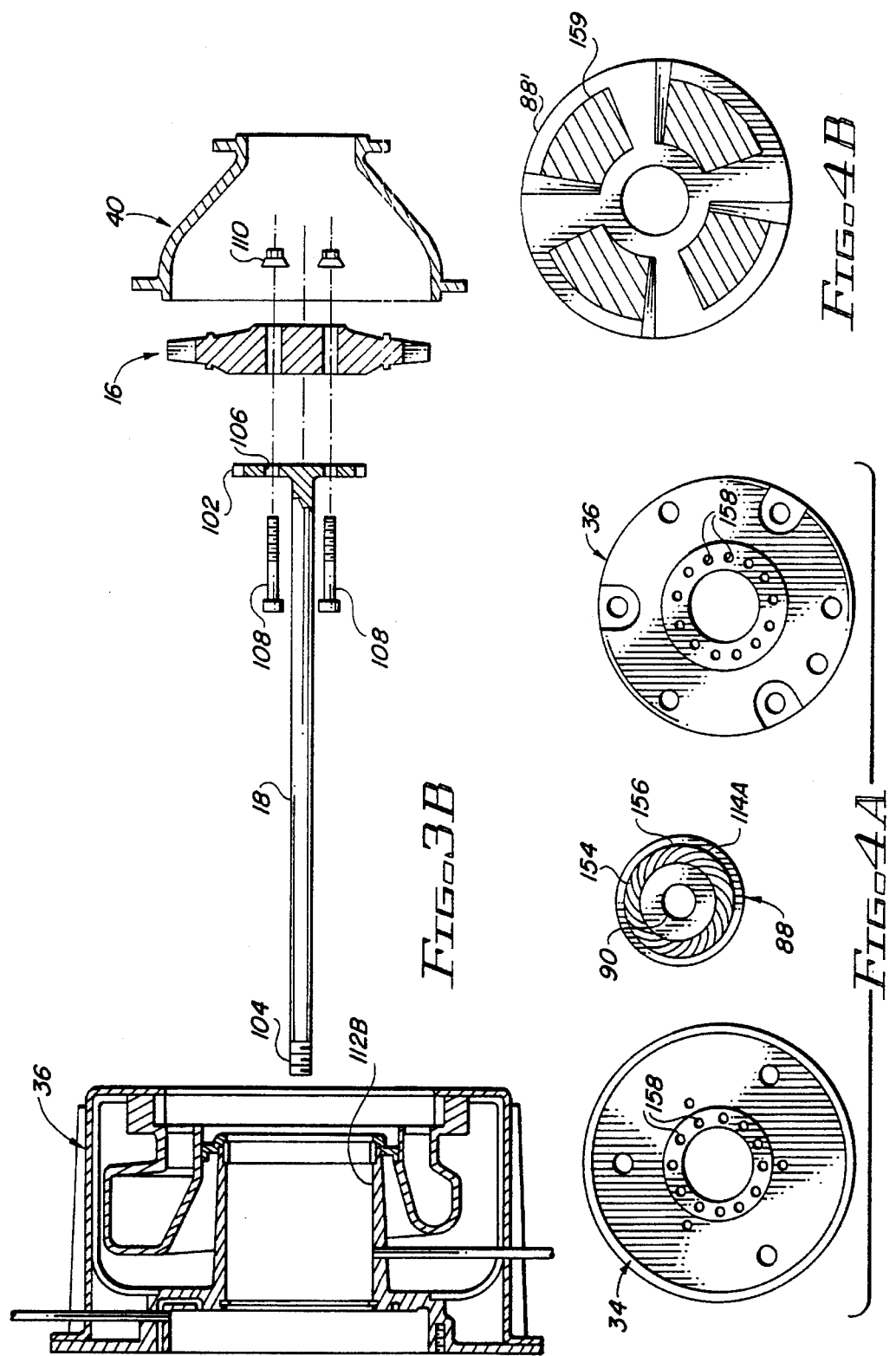

CRYOGENIC TURBOPUMP

BACKGROUND OF THE INVENTION

The emergence of cryogenic fuels such as liquid hydrogen and liquid oxygen as the leading candidates for use within orbital transfer vehicles and transatmospheric vehicles results in a need for reliable cryogenic fuel turbopumps. These turbopumps are placed intermediate the fuel tanks and the engine assembly in order to deliver cryogenic fuel to the engine at a desired high pressure. The turbopumps must operate at or near the cryogenic temperatures of the fuels while it is essential that the turbopumps be extremely reliable. Additionally, use on these types of vehicles inherently requires an efficient and compact configuration.

Generally, the cryogenic fuel turbopump will have a rotating assembly including a turbine and a pump mounted on a common shaft all contained within a housing assembly. Since the rotating group is the only moving element within the turbopump, mounting and support of the rotating assembly becomes the critical factor with respect to the reliability and life of the turbopump. Currently, cryogenic turbopumps use ball bearing type journal bearings to support the rotating assembly. However, ball bearings operating at cryogenic temperatures have short and unpredictable service lives. The premature failure of ball bearings in these turbopumps may be traced to one or more of the following factors. First, cryogenic temperatures preclude the use of conventional oil lubricating methods. Second, these turbopumps operate at high speeds for maximum efficiency, at these speeds the centrifugal forces on the balls become excessive and thereby limit bearing life. Third, to adapt ball bearings to high speed applications, the bearing diameter is reduced to achieve a lower DN (diameter times RPM) value, adversely resulting in the shaft bending critical speed approaching the maximum operating speed and making the rotating assembly sensitive to out of balance forces. Thus, ball bearing systems are not deemed practical for high reliability turbopumps that require long life.

As an alternative to ball bearings, the use of hydrostatic journal bearings and tilting pad journal bearings have been explored. In the case of hydrostatic bearings that utilize the high pressure available in the turbopump, rotor dynamic performance is critical. This requires careful design and consideration of the interaction of bearing pressure, stiffness, damping parameters, and rotor natural frequencies during transient speed operation. To accomplish a desirable balancing of the factors, the estimated bearing clearance for high-speed turbopump applications is approximately 0.0012 cm (0.0005 in). These close clearances present initial fabrication difficulties, as well as operational problems related to centrifugal and thermal differential growth, and dirt contamination over the entire range of operating speeds and temperatures.

For high pressure high speed turbopumps, the axial forces acting upon the rotating group become very large, requiring careful design of a thrust bearing to accommodate these large forces. As in the case of the journal bearings, ball bearing type thrust bearings are not practical due to the low temperatures and high speed.

It is thus apparent that there is a need for a turbopump which remains operational at cryogenic temperatures, and which features an efficient, reliable, and durable mounting and supporting configuration for the rotating group.

DISCLOSURE OF THE INVENTION

The present invention details a cryogenic turbopump for pumping cryogenic liquid fuel which features a multistage pump attached to a turbine and supported on process fluid hydrodynamic foil journal bearings and hybrid hydrodynamic-hydrostatic thrust bearings. The turbopump includes a pair of hydrodynamic foil journal bearings positioned along a shaft interconnecting the turbine with the pumps. These foil bearings are provided with a flow of cooling process fluid which is scavenged from a high pressure location downstream of one of the pump stages and dumped to a lower pressure location. The hybrid hydrodynamic-hydrostatic thrust bearing is positioned intermediate the turbine and the pumps proximate to a thrust disk attached to and rotating with the shaft. At operational speeds, the hybrid bearing receives a flow of high pressure process fluid from the output of the final stage pump. The fluid being then vented to a lower pressure location. The hybrid bearing further includes hydrodynamic features to initially generate pressure gradients with available fluids at startup, and to additionally increase the load capacity of the hybrid bearing at operational speeds without resorting to dramatically increasing the diameter of the thrust disk.

BRIEF DESCRIPTION OF THE DRAWINGS

FIG. 2 is an exploded cross-sectional view of the rotating group from the turbopump of FIG. 1;

FIG. 3 is an exploded cross-sectional view showing the assembly of the turbopump of FIG. 1;

FIG. 4A, 4B, 4C are plane views of the hybrid thrust bearing assembly including alternate bearing disk elements from within the turbopump of FIG. 1.

BEST MODE FOR CARRYING OUT THE INVENTION

Figure 1:
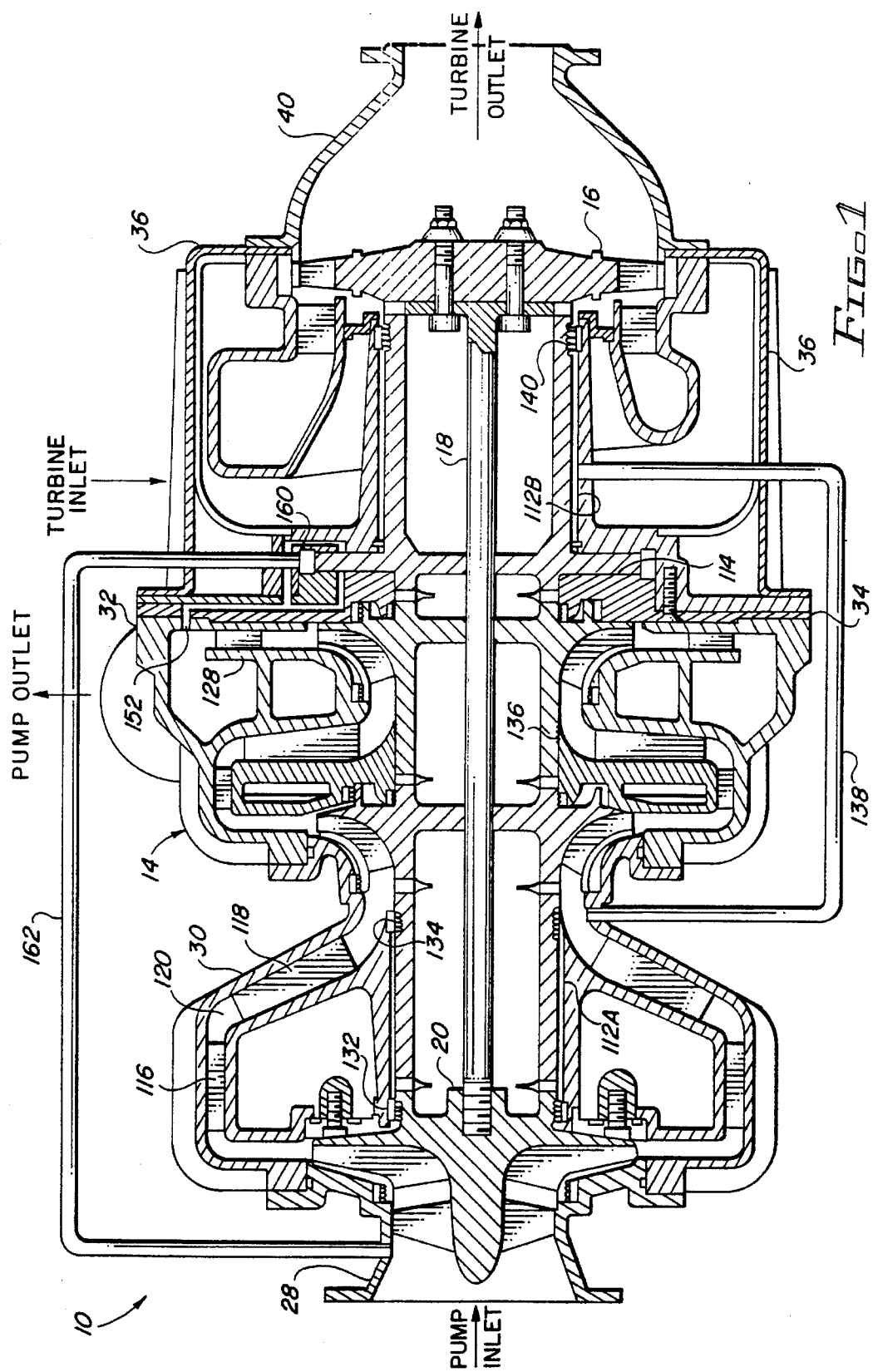
FIG. 1 is a cross-sectional view of a multi-pump high pressure cryogenic turbopump.

FIG. 1 shows a cross-sectional view of a high pressure cryogenic fluid turbopump 10 having a rotating group 12 contained within a housing assembly 14. The rotating group 12 includes turbine 16, for extracting useful work from a flow of pressurized fluid, attached to a drive shaft 18 which extends axially through the center of the turbopump 10 and is connected at an opposite end to a first stage pump 20. The rotating group 12 also includes a second stage pump 22 and a third stage pump 24, as well as a bearing member 26, all located between the turbine 16 and first stage pump 20. The housing assembly 14 is assembled from a number of elements including an inlet duct 29, first stage shroud duct 30, second stage shroud duct 32, thrust plate 34, turbine shroud assembly 36 including a turbine involute 38, and turbine outlet duct.

The rotating group 12 is depicted in an exploded cross-sectional view in FIG. 2. Within the rotating group the first stage pump 20 has a hub 42 including a threaded bore 44 at the center, and a circumferential shoulder 46 on its backside 48. The first stage pump 20 also includes primary impeller blades 50 and inducer blades 52 on its front or fluid flow side 54, both of which extend from the hub section 42. The second stage pump 22 includes a hub 56, shrouded impellers 58 extending from the hub 56, an axial bore 60 through the center of hub 56, a bearing cylinder 62 extending axially forward from the impeller side 64 of hub 56, as well as a shoulder 66 and sealing ring 68 which extend from a backside 70 of hub 56. The third stage pump 24 is constructed similar to the second stage pump 22 in that it also includes a hub 72 with shrouded impellers 74, and projecting cylinder 76 on a front side 78 of hub 72, shoulder 80 and sealing ring 82 on a back side 84 of hub 72, and an axial bore 86 through the center of hub 72. The bearing member 26 includes a thrust bearing disk 88 having an axial bore 90 through its center, as well as a shoulder 92 projecting toward third stage pump 24 and a journal bearing cylinder 94 projecting toward turbine 16. Turbine 16 has a hub 96, including axially aligned bores 98 extending therethrough, and a plurality of turbine blades 100 extending radially outward from the outer circumference of hub 96. The drive shaft 18 includes a flange 102 at the turbine end and a threaded end 104 at the pump end. The threaded end 104 of drive shaft 18 is compatible with the threaded bore 44 of the first stage pump 20. The flange 102 of drive shaft 18 includes axially aligned bores 106 which may be aligned with axially aligned bores 98 of turbine 16 such that bolts 108 and nuts 110 may be utilized to secure drive shaft 18 to turbine 16.

The rotating group 12 is assembled by first attaching the turbine 16 to drive shaft 18. Next, the threaded end 104 of drive shaft 18 is passed through the axial bores 90, 86, and 60 of bearing member 26, third stage pump 24, and second stage pump 22 respectively, so that the threaded end 104 may engage the threaded bore 44 of the first stage pump 20. The shoulder 46 of first stage pump 20 has the same inner and outer diameter, and is aligned with bearing cylinder 62 of second stage pump 22. Similarly, shoulder 66 and projecting cylinder 76 of second stage pump 22 and third stage pump 29 respectively, have equal inner and outer diameters and are aligned, as are shoulders 80 and 92 of third stage pump 24 and bearing member 26 respectively. The journal bearing cylinder 94 of bearing member 26 has an inner diameter slightly larger than the diameter of flange 102 of drive shaft 18, such that the journal bearing cylinder 94 fits over the flange 102 and butts against the hub 96 of turbine 16. By this arrangement, the drive shaft 18 may be engaged with the first stage pump 20 such that the drive shaft 18 is in tension while the second stage pump 22, third stage pump 24, and bearing member 26 are all subject to a compressive load acting between the first stage pump 20 and the turbine 16. Thus, the second and third stage pumps 22 and 24 and the bearing member 26 are all made to rotate as one unit with the turbine 16 and first stage pump 20.

The rotating group 12 and housing assembly 14 must be cooperatively assembled as depicted within FIG. 3. The first stage pump 20 is first placed proximate the inlet duct 28 and the first stage shroud 30 is then attached to inlet duct 28. Next, the second stage pump 22 is inserted into the first stage shroud 30, and the second stage shroud duct 32 is placed over the second stage pump 22 and is attached to the first stage shroud duct 30. In a separate operation, the journal bearing cylinder 94 of the thrust bearing member 26, is inserted into the turbine shroud assembly 36 and thrust plate 34 is secured to turbine shroud assembly 36, thereby enclosing bearing member 26. The thrust plate 34 and turbine shroud assembly 36 are then attached to second stage shroud duct 32. After securing the turbine 16 to flange 102 of drive shaft 18, the drive shaft 18 is passed through axial bores 90, 86 and 60 and the threaded end 104 engages the threaded bore 44 of the first stage pump 20. Finally, turbine outlet duct 40 is attached to the turbine shroud assembly 36.

The turbopump 10 is designed to operate at a very high rotational speed for the rotating group 12, and to compress and pump a flow of fuel at cryogenic temperatures to a very high pressure. Accordingly, the support system for the rotating group 12 is critical. The cryogenic turbopump 10 is equipped with at least one and generally two sets of foil journal bearing assemblies 112A, B. A first foil journal bearing assembly 112A is secured within first stage shroud duct 32 proximately encircling the bearing cylinder 62 of the second stage pump 22. A second foil journal bearing assembly 112B is mounted within the turbine shroud assembly 36 proximately encircling the journal bearing cylinder of bearing member 26. The turbopump 10 also includes hydrostatic-hydrodynamic hybrid thrust bearings 114, hybrid thrust bearing 114A is mounted on bearing disk 88 proximate and facing the thrust plate 34, and hybrid thrust bearing 114B mounted on an opposite side of bearing disk 88 of bearing member 26 proximate to turbine outlet duct 40.

When the turbopump 10 is in operation, fluid exiting from one of the pump stages has been pressurized and accelerated. By subsequently decelerating the fluid, the pressure will further increase. Accordingly, the first stage shroud duct 30 is equipped with a plurality of diffuser vanes 116 as well as deswirl vanes 118 within a duct 120 which conducts the fluid exiting the first stage pump 20 to the inlet of the second stage pump 22. Similarly, the second stage shroud duct 32 includes a plurality of second diffuser vanes 122 and second deswirl vanes 124 within a duct 126 which conducts fluid exiting the second stage pump 22 to the inlet of the third stage pump 24. The second stage shroud duct 32 also includes a plurality of third diffuser vanes 128 within an outlet duct 130, located downstream of the fluid exit from the third stage pump 32.

The turbopump 10 is driven by a flow of high pressure fluid which is received and distributed by turbine volute 38 so as to be directed uniformly upon turbine blades 100 of turbine 16. The turbine 16 extracts useful work from the flow of high pressure fluid in the form of rotational power. This rotational power drives the rotating group 12, including first, second, and third stage pumps 20, 22, and 24 to very high rotational speeds. A source of cryogenic liquid such as liquid hydrogen or liquid oxygen, which is stored at a low pressure, is provided to the turbopump 10 via inlet duct 28. Therein, inducer 52 initiates flow of the liquid into the first stage pump 20, wherein energy is transferred to the liquid such that upon exiting the pump 20, the liquid has been accelerated and compressed to a higher kinetic energy and pressure. The liquid then flows through duct 120 wherein the diffuser vanes 116 and deswirl vanes 118 act to reduce the flow speed of the fluid, thereby changing some of the kinetic energy of the fluid into potential energy in the form of increased pressure. The fluid is then directed upon second stage pump 22 wherein it is similarly pressurized and accelerated. Upon exiting the second stage pump 22 the fluid enters duct 126 wherein the second diffuser vanes 122 and second deswirl vanes 124 decelerate the fluid and further increase the pressure. The fluid then enters the third stage pump 24 wherein it is accelerated and pressurized. Upon exiting the third stage pump 24, the fluid flows through outlet duct 130 wherein third diffuser vanes 128 decelerate the fluid, thereby further pressurizing the fluid to its final high output pressure level.

Due to the in line mounting of the three pump stages 22, 24 and 26, about the common drive shaft 18, there exists the potential for pressurized fluid to recirculate back along the outer diameter of bearing cylinder 62 or projecting cylinder 76 to the backside of the previous pump 20 or 22. Recirculation of fluid from the entrance to second stage pump 22 to the backside 48 of first stage pump 20 along bearing cylinder 62 is controlled by rotating labyrinth seals 132 and 134 located on shoulder 46 and bearing cylinder 62 respectively. It is desirable to allow some recirculation along bearing cylinder 62 as this provides a flow of cooling fluid to foil journal bearing assembly 112A. Projecting cylinder 76 of third stage pump 24 also includes a rotating labyrinth seal 136 to minimize recirculation from the entrance to the third stage pump 24 to the backside 70 of the second stage pump 22. In order to provide of flow of cooling fluid to foil journal bearing assembly 112B, a conduit 138 is provided which conducts fluid bled from downstream of one of the pumps 20, 22, or 24 to the foil journal bearing assembly 112B. To control the amount of cooling fluid provided to a bearing assembly 112B, the journal bearing cylinder 94 is provided with a rotating seal 140 which controls the fluid flow leaking into the turbine 16.

Figure 4C:
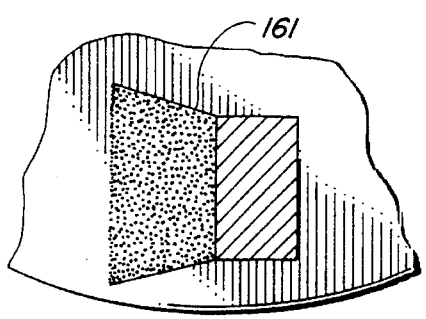

The sealing rings 68 and 82, of second stage pump 22 and third stage pump 24 respectively, include rotating labyrinth seals 142, 144 which prevent fluid exiting the pump 22, 24, from leaking down the backsides 70 and 84 of the hubs 56 and 72. However, as shown in FIG. 2, the radius from the centerline to the sealing rings 68 and 82 is $R_1$, while the radius to the outer edge of the pumps 22 and 24 is $R_2$. Thus, there is an area between $R_1$ and $R_2$ which is pressurized by fluid downstream of the pump stage. This area A is equal to the product of $\pi$ times the quantity $R_2$ squared minus $R_1$ squared ($A=\pi(R_2^2-R_1^2)$). For the turbopump 10 of the present invention, typical values for $R_1$ would be 1.3 inches while $R_2$ would be 1.7 inches, resulting in a value for the area A of 3.77 in. sq.. This area is subjected to the pressure of the fluid leaving the respective pumps 22 or 24, thus imposing an axial force on the rotating group 12. This axial force is balanced at design operating speeds by pressures acting on impeller shrouds 146, 148, 150, as well as other surfaces of the pumps 20, 22, 24, and the turbine 16, with any remaining axial force being applied to the hybrid thrust bearing 114. However, at off-design operating speeds, the hybrid thrust bearing 114 may have to counter-balance significant axial forces acting upon the rotating group 12. In order to provide high load capacity for the hybrid bearing 114 a passage 152 conducts high pressure fluid, bled from the outlet duct 130, to the hybrid thrust bearing 114 to provide a hydrostatic load bearing component. FIG. 4A shows a plane view of the thrust bearing disk 88 with hybrid bearing 114A, which includes surface variations such as a plurality of generally spiral grooves 154 separating bearing surfaces 156. Also shown is the thrust plate 34 which includes inherently compensated fluid feeding holes 158 to deliver presurized fluid to the hybrid thrust bearing 114A. The spiral grooves 154 provide hydrodynamic characteristics which amplify the fluid pressure provided via fluid feedings holes 158 to increased load support. Although spiral grooves 154 are shown for the hydrodynamic feature, other surface variations such as Rayleigh steps 159 or pockets 161 shown in FIGS. 4B, 4C may also be used. It should also be noted that the hydrodynamic characteristics of the thrust bearing 114 allows for less stringent tolerances in the spacing between the thrust plate 34 and the thrust bearing disk 88. Additionally, under startup conditions, the hybrid bearing 114 develops hydrodynamic forces from available fluid, thus significantly reducing startup drag. In order to provide the largest pressure drop for the hybrid bearing 114, the pressurizing fluid flows into an annular channel 160 which is ducted via a conduit 162 to the inlet duct 28.

Figure 5:
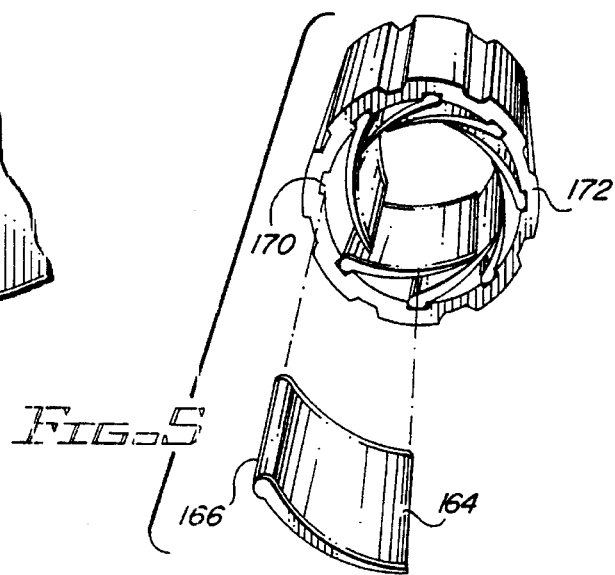
FIG. 5 is a perspective view of the foil journal bearing assemblies from within the turbopump of FIG. 1.

The foil journal bearings assemblies 112A, B are shown in a detailed perspective view within FIG. 5. The foil journal bearing assemblies 112 include a plurality of foils 164, which are secured from rotation at their trailing edge 166 via mounting bars 168 which axially engage slots 170 within a cylindrical journal 172. The journal 172 is designed to be mounted within the first stage shroud duct 30 or turbine shroud assembly 36 of FIG. 1. The foils 164 are formed with a specific radius of curvature and thickness, and maintain contact with the rotating group 12 when it is at rest. The foils 164 lift off When a fluid film is developed by the motion of the rotating group 12. No wear occurs once the rotating group 12 reaches a minimum speed. A protective coating such as Teflon may be applied to the foils 164 to prevent wear during start and stop transients.

It may be appreciated that at operational speeds, the rotating group 12 of the turbopump 10 is supported on films of process fluid in both the axial and radial directions, without any frictional contact. Thus the bearing system of the turbopump 10 is made extremely reliable in operation, allowing the turbopump 10 to perform error free for extended periods of time. In addition, the foil journal bearing assemblies 112 are inherently stable for high-speed operations because of the tracking ability of the foils 164. Moreover, because of the light mass of the foils 164, there is no foil flutter instability.

Furthermore, the foils 164 are soft relative to the fluid film, and deflect to accommodate misalignment or thermal distortion. This characteristic is well suited to cryogenic operation, and makes the foil journal bearing 112 superior to rigid geometry fluid film bearings. Moreover, the low foil stiffness in conjunction with a relatively rigid cylinderical journal bearing results in the first two critical speeds being in rigid body modes (cylindrical and conical resonance modes) and being very low compared with the unit design speed. Whereas, the third critical speed is in the bending mode, and is much higher than the design speed.

Figure 6:
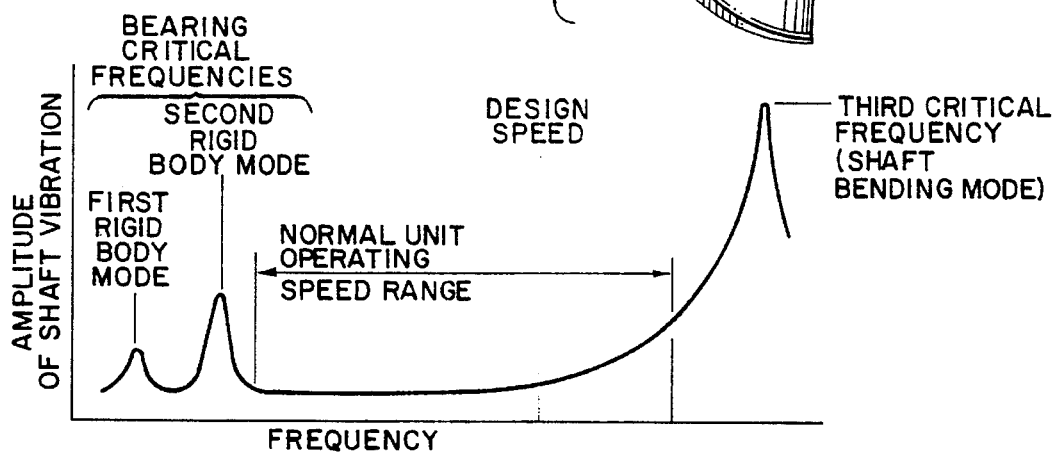
FIG. 6 is a graph showing frequency versus amplitude of shaft vibration for the rotating group of the turbopump.

A typical rotor dynamic response and critical speed diagram is shown in FIG. 6. The wide separation between the first two and the third critical speeds provides a large critical-speed-free operating range. Because of a large margin between the speed of the rotating group 12, and the rigid body critical speeds, any mass imbalance is attenuated. Thus, foil journal bearing assemblies 112 are not sensitive to mass imbalance.

Figure 7:
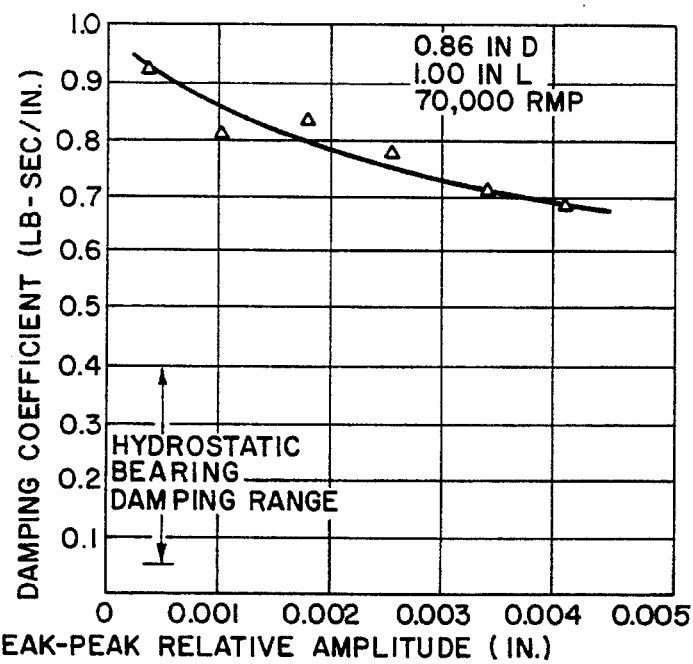
FIG. 7 is a graph showing peak to peak relative amplitude versus damping coefficient for foil bearing and hydrostatic bearings.

Excellent damping is provided by the squeeze-film mechanism in the foil bearing fluid film, as well as the coulomb friction that develops where the overlapping foils 164 contact one another and the journal 172. Foil bearing damping is generally larger than that of hydrostatic bearings, as illustrated in FIG. 7. The foil bearing damping values in FIG. 7 were obtained experimentally, while the damping for the hydrostatic bearing of the same size was calculated based on lubrication theory, which states that bearing damping is inversely proportional to the cubic power of bearing clearance. The upper limit of 0.4 lb-sec/in. is for a clearance of 0.0005 in., which is about the smallest clearance practical.

Typical applications of the turbopump 10 of the present invention include pumping liquid hydrogen or liquid oxygen within an oxygen/hydrogen burning fuel system. By way of example, the turbopump 10 can be used to pump liquid hydrogen at a flow rate of 10 pounds per second from an inlet pressure and temperature of 65 pounds per square inch ambient and 36 degrees Rankin to an outlet pressure of 5500 pounds per square inch ambient. The turbine 16 of the turbopump 10 utilizes a 5.9 pounds per second flow of gaseious hydrogen having a turbine inlet pressure and temperature of 2700 pounds per square inch ambient: and 1500 degrees Rankin, and a turbine outlet pressure of 1500 pounds per square inch ambient to produce approximately 4060 horsepower and drive the pumps 20, 22 and 24 at a design operating speed of 120,000 rpm.

While one specific embodiment of the invention has been illustrated and described, it is to be understood that this is provided by way of example only and that the invention is not to be consrued as being limited thereto but only by the scope of the following claims.

What is claimed is:

1. A turbopump operative to pump cryogenic process fluid comprising:

turbine means for extracting useful work in the form of rotational power from a flow of pressurized fluid;

pump means for compressing and accelerating said cryogenic process fluid from a relatively low pressure to a relatively high output pressure;

shaft means for interconnecting said turbine means and said pump means;

a housing assembly to contain said turbine means, said pump means and said shaft means, and to provide flow passages for said cryogenic process fluid and said pressurized fluid;

bearing means for radially supporting said shaft means on a film of cryogenic process fluid, said bearing means mounted within said housing assembly proximate to said shaft means; and hydrostatic-hydrodynamic hybrid thrust bearing means for axially supporting said shaft means on a film of cryogenic process fluid, said bearing means mounted within said housing assembly proximate to said shaft means, said hybrid thrust bearing means mechanically operative as a hydrodynamic bearing at low rotational speeds of said shaft means and as a hydrodynamically enhanced hydrostatic bearing at high rotational speeds of said shaft means.

2. The turbopump of claim 1 wherein said bearing means comprises:

at least one foil journal bearing means for radially supporting said shaft means.

3. The turbopump of claim 2 wherein said foil journal bearing means includes a plurality of overlapping foils encircling a cylindrical section of said shaft means.

4. The turbopump of claim 2 wherein said shaft means includes a bearing disk, located intermediate said turbine means and said pump means, said bearing disk having a hydrodynamic surface area of said hybrid thrust bearing means.

5. The turbopump of claim 4 further comprising:

a fluid passageway within said housing assembly, said fluid passageway interconnecting said hybrid thrust bearing means with a source of high pressure cryogenic process fluid.

6. The turbopump of claim 3 wherein said plurality of overlapping foils are individually secured against rotation at a trailing edge thereof.

7. The turbopump of claim 5 wherein said bearing disk includes surface variations to generate hydrodynamic pressure between said bearing pad and said bearing disk with rotation of said bearing disk.

8. The turbopump of claim 7 wherein the magnitude of said hydrodynamic pressure generated by said surface variations increases with increasing relative rotation.

9. The turbopump of claim 7 wherein said surface variations of said bearing pad amplify available hydrostatic pressure.

10. The turbopump of claim 7 wherein said surface variations of said bearing disk are a plurality of generally spiral grooves separating a plurality of bearing surfaces.

11. The turbopump of claim 7 wherein said surface variations of said bearing disk are a plurality of steps.

12. The turbopump of claim 7 wherein said surface variations of said bearing disk are a plurality of pockets.

13. The turbopump of claim 5 wherein said fluid passageway ends at a plurality of fluid feeding holes which distribute pressurized process fluid to said hybrid thrust bearing.

14. A cryogenic turbopump comprising: a housing, said housing defining a first inlet, a first outlet, and a first flow path extending from said first inlet to said first outlet for communicating a flow of cryogenic process liquid therebetween, said housing further defining a second inlet, a second outlet, and a second flow path extending from said second inlet to said second outlet for communicating a flow of motive fluid therebetween, a rotor member rotatably disposed in said housing, said rotor member including a turbine portion rotatably received in said second flow path for extracting shaft power from said flow of motive fluid, said turbine proportional rotationally driving the remainder of said rotor member in response to said flow of motive fluid in said second flow path, said rotor member further including pump means axially spaced from said turbine portion and drivingly carried by the remainder of said rotor member, said pump means including a pump portion moving said flow of process fluid through said first flow path in response to rotation thereof with a resulting increasing pressure gradient from said first inlet to said first outlet, said housing and said rotor member cooperatively defining radial and hybrid hydrodynamic hydrostatic axial bearing means for journaling said rotor member within said housing, and third flow path means having an inlet end communicating with said first flow path at a location of comparatively high pressure level of said pressure gradient and extending through said hybrid axial bearing means to an outlet end at one of said first flow path at a location of comparatively lower pressure level of said pressure gradient or to said second flow path for communicating a controlled flow of said cryogenic process liquid through said hybrid axial bearing means.

15. The invention of claim 14 wherein said bearing means includes said rotor member defining an axially elongate bearing cylinder portion, said housing defining an axially elongate bearing journal portion axially aligning with said cylinder portion and circumscribing the latter, a plurality of circumferentially extending bearing foil members carried by said journal portion radially intermediate thereof and said cylinder portion, said cylinder portion and said journal portion cooperatively defining an axially extending flow channel in part defining said third flow path means.

16. The invention of claim 5 wherein said cryogenic turbopump further includes another pump portion carried by the remainder of said rotor member and axially spaced from said pump portion, said another pump portion being in liquid flow series with and downstream of said first-recited pump portion with respect to flow of said cryogenic liquid, said bearing means being disposed axially between said pump portion and said another pump portion, said third flow path means extending from said inlet end upstream of said another pump portion with respect to flow of said cryogenic process liquid axially through said bearing means via said flow channel defined thereby and to said outlet end adjacent said pump portion.

17. The invention of claim 15 wherein said turbopump includes said bearing means being disposed axially intermediate said turbine portion and said pump means, said third flow path means extending from said inlet end at said first flow path through said bearing means via said flow channel defined thereby and to said second flow path.

18. The method of pumping cryogenic liquid, said method including the steps of: defining a pumping flow path by the cooperation of a housing and a rotor member journaled within said housing, defining a motive fluid flow path by the cooperation of said housing and said rotor member, directing a flow of motive fluid through said motive fluid flow path, and rotating said rotor member in response to said flow of motive fluid, flowing cryogenic liquid through said pumping flow path against a pressure head in response to rotation of said rotor member, utilizing a hybrid hydrodynamic-hydrostatic axial thrust bearing having an axial load capacity significantly exceeding that of hydrostatic bearings to journal said rotor member within said housing, and directing a flow of said cryogenic liquid axially along said bearing member in response to said pressure head.

19. The turbopump of claim 1 further comprising
 a fluid passageway within said housing assembly, said fluid passageway interconnecting said hybrid thrust bearing means with a source of high pressure cryogenic process fluid; from downstream of said pump means; and
 a conduit means for dumping cryogenic process fluid scavenged from said hybrid thrust bearing means to a location upstream of said pump means.

20. A hybrid hydrostatic-hydrodynamic thrust bearing for use within a high pressure pump assembly contained within a housing, said hybrid thrust bearing comprising:
 a hydrodynamic foil bearing mounted to a stationary disk section of said housing, said hydrodynamic foil bearing including a plurality of compliant foils configured to promote a supporting hydrodynamic fluid profile at low operational speeds;
 a thrust disk proximate to and facing said hydrodynamic foil bearing, said thrust disk including hydrodynamic surface variations to promote a supporting hydrodynamic fluid profile; and
 a pressurized fluid supply means for delivering pressurized operating fluid from downstream of said pump to said hybrid thrust bearing to hydrostatically pressurize said hybrid thrust bearing thereby said hybrid thrust bearing is mechanically operative as a hydrodynamic bearing at low operational speeds and as an hydrodynamically enhanced hydrostatic bearing at high operational speeds of said pump.

* * * * *